Figure 1:
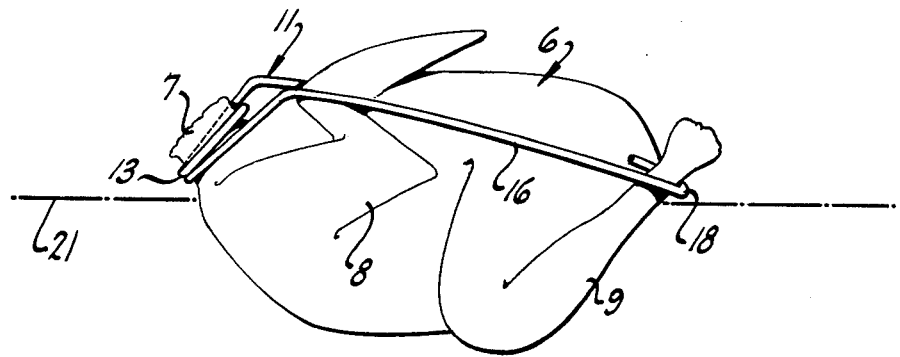

United States Patent

Moncrief

[11] 3,877,109
[45] Apr. 15, 1975

[54] HOLDER FOR FOWL

[76] Inventor: J. D. Moncrief, 3139 Woodmark Ct., Sacramento, Calif. 95821

[22] Filed: July 2, 1973

[21] Appl. No.: 375,761

[52] U.S. Cl. .................................. 17/44.1; 17/1 S
[51] Int. Cl. ............................................ A22c 15/00
[58] Field of Search .......... 17/11, 1 S, 1 A, 1 R, 44, 17/44.1, 44.2, 44.3, 44.4; 99/350, 351

[56] References Cited
UNITED STATES PATENTS

| 283,418 | 8/1883 | Ries | 17/44.3 |
|---|---|---|---|
| 511,238 | 12/1893 | Hieatzman | 17/44 |
| 569,142 | 10/1896 | Travers | 17/44.3 |
| 1,438,659 | 12/1922 | Nailor | 17/44.1 |
| 2,817,111 | 12/1957 | Conaway | 17/44.1 |
| 3,112,515 | 12/1963 | Volk | 17/11 |
| 3,201,824 | 8/1965 | Konopa | 17/11 |

FOREIGN PATENTS OR APPLICATIONS

| 503,071 | 3/1939 | United Kingdom | 17/44.1 |
|---|---|---|---|
| 74,590 | 5/1890 | Germany | 17/44.3 |

Primary Examiner—Richard C. Pinkham
Assistant Examiner—Arnold W. Kramer
Attorney, Agent, or Firm—Lothrop & West

[57] ABSTRACT

A holder for a fowl having a neck, wings and legs, particularly for use in turnspit roasting of the fowl, includes a metal bar configured to provide a central loop adapted to encircle a truncated portion of the neck of the fowl. Side portions of the configured bar are symmetrically disposed with respect to the loop and extend along the fowl sides to overlie the fowl wings. The two ends of the bar are configured to afford confronting U-shaped portions which hook around and restrain the legs of the fowl.

2 Claims, 2 Drawing Figures

PATENTED APR 15 1975 3,877,109

HOLDER FOR FOWL

In many instances the cooking of fowl, particularly a dressed fowl which has had the feathers, some of the leg portions and wing portions and some of the head removed to leave a truncated neck, is carried out by means of a rotary spit on which the dressed fowl is impaled. There is often difficulty in that during the rotation of the spit the fowl's appendages move or repeatedly fall and so are subjected to various and sometimes deleterious effects of the cooking heat.

There are known ways of tying or securing the fowl appendages but these are usually temporary in nature, are difficult to accomplish and to remove and sometimes impart foreign flavor or other unwanted characteristics to the cooked fowl. When done in quantity, they are time consuming and expensive.

It is therefore an object of this invention to provide a holder for fowl which is readily utilized in connection with the fowl to be cooked and which is effective to hold the various parts of the fowl in appropriate relationships during the cooking operation.

Another object of the invention is to provide a holder for fowl that can easily be attached to and detached from the fowl.

Another object of the invention is to provide a holder for fowl that is simple, inexpensive and sanitary so that there is no real objection to its use but there are many advantages flowing from its use.

Another object of the invention is to provide a holder for fowl that can readily be utilized by relatively unskilled people in the cooking of fowl.

Another object of the invention is in general to provide an improved holder for fowl.

Figure 2:
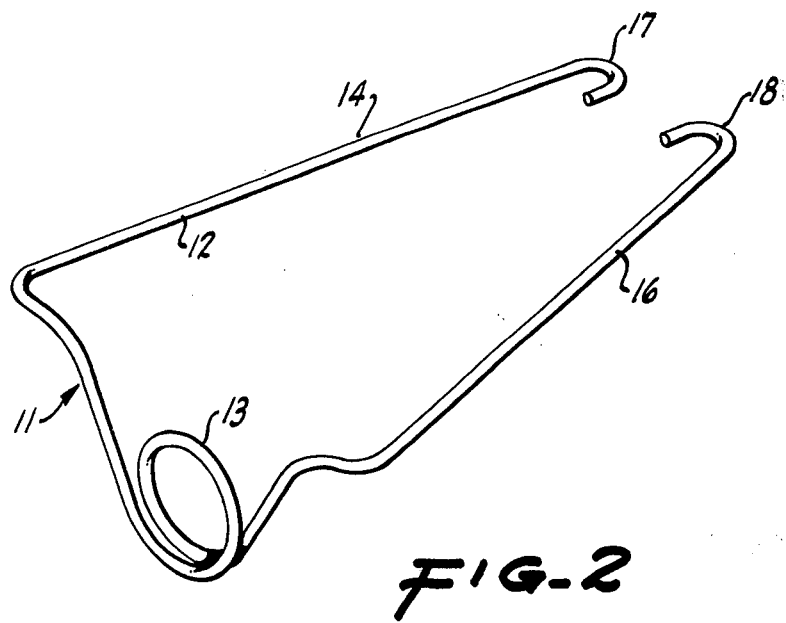

Other objects of the invention together with the foregoing are attained in the embodiment of the device described in the accompanying description and illustrated in the accompanying drawings, in which:

FIG. 1 is a side elevation of a holder for fowl in place on a typical fowl in position for use; and FIG. 2 is an isometric view showing the holder for fowl detached from the fowl and as it appears prior to use.

While the holder for fowl pursuant to the invention can be practically embodied in a large number of different ways, it has with particular success been embodied as shown herein.

In one representative case the holder for fowl is useful in connection with a bird 6 such as a chicken, for example, from which the head has been removed to leave a truncated portion 7 of the fowl neck. The fowl has side wings 8 as well as legs 9 that customarily have been curtailed or trimmed. The fowl itself has been cleaned or dressed and is ready for cooking. For use with such a fowl there is provided a holder, generally designated 11, as shown in FIG. 2. This is an article of manufacture or a unitary device comprised of a single bar 12 preferably of well-finished metal, either stainless or not easily subject to surface contamination. The bar is conveniently of iron or steel and is circular in cross-section, although other cross-sectional shapes can easily be employed.

In a central portion of the bar there is a configuration in the form of a loop 13 having one complete turn and having an inside diameter that is slightly greater than the expected outside diameter of the truncated neck portion 7. From the single loop 13 the bar extends symmetrically on opposite sides thereof to afford a pair of side portions 14 and 16. These are relatively rectilinear and conveniently lie in the same plane. The portions 14 and 16 are intended to overlie the wings 8 and to hold them close to the body when the loop 13 circumscribes the truncated neck 7.

The ends of the bar beyond the portions 14 and 16 are configured to afford U-shaped portions 17 and 18, preferably in substantially the same plane as the side portions 14 and 16 and turned in toward or confronting each other. The curvature of the U-shaped portions is preferably such that they snugly engage around portions of the legs 9.

The general plane of the side portions 14 and 16 as well as of the end portions 17 and 18 is disposed to one side of the neck loop 13. It can be considered that the neck loop is upstanding from and for the most part is outside of the general plane of the structure.

The device out of use is substantially as shown in FIG. 2 and can easily be supported on a hook or other retaining device. When it is to be placed in use the device is arranged with the loop 13 around the truncated neck 7 of the fowl, and the side portions 14 and 16 are arranged rearwardly of the body of the fowl overlying the wings 8. The U-shaped portions 17 and 18 are arranged in engagement with the legs 9. While the fowl itself is somewhat yielding and flexible, the material of the holder is likewise flexible and somewhat springy so that in position the wing and leg portions of the fowl are tightly held against the body of the fowl and against ready displacement, both laterally and longitudinally. This positioning is usually accompanied by some springing of the fowl holder so that the fowl parts are resiliently held precisely in position.

A fowl so trussed or held is usually mounted on a spit (not shown) which rotates about an axis 21 (FIG. 1) ranging substantially through the center of gravity of the fowl. As the spit and fowl rotate together, the holder is effective to secure all of the fowl parts in position against rotational or gravitational displacement so that uniform cooking is achieved.

Following cooking of the fowl and removal thereof from the spit, the holder is unhooked from the legs by releasing the U-shaped portions 17 and 18 therefrom, the side portions 14 and 16 spring out from the wings 8 and the loop 13 is lifted off of the truncated neck 7. The holder can then be washed or otherwise treated and prepared for a subsequent use.

What is claimed is:

1. A holder for fowl having a body, neck, wings and legs, said holder comprising:
   a. a continuous bar configured to provide a central loop lying in a first plane and adapted to encircle a truncated portion of the neck;
   b. a pair of side portions, extending from and being symmetrically disposed with respect to said loop and lying substantially in a second plane angularly disposed relative to said first plane, said side portions being of a length and spaced apart a distance such that said side portions are capable of snugly overlying the wings and holding the wings close to the body when said loop circumscribes the truncated neck; and,
   c. a pair of U-shaped portions at the ends of said side portions remote from said loop, said U-shaped portions confronting each other and lying substantially in said second plane, said U-shaped portions being spaced apart a distance such that said U-shaped portions are capable of hooking around and restraining the legs.

2. A holder for fowl as in claim 1 in which said loop at least for the most part projects out of said second plane.

* * * * *